Dec. 28, 1948.  J. V. DAVIS ET AL  2,457,449
FILTER
Filed May 13, 1946  2 Sheets-Sheet 1

INVENTOR.
JOHN V. DAVIS.
JOHN S. HOFFMAN.
BY
*Samuel Wiseman*
ATTORNEY.

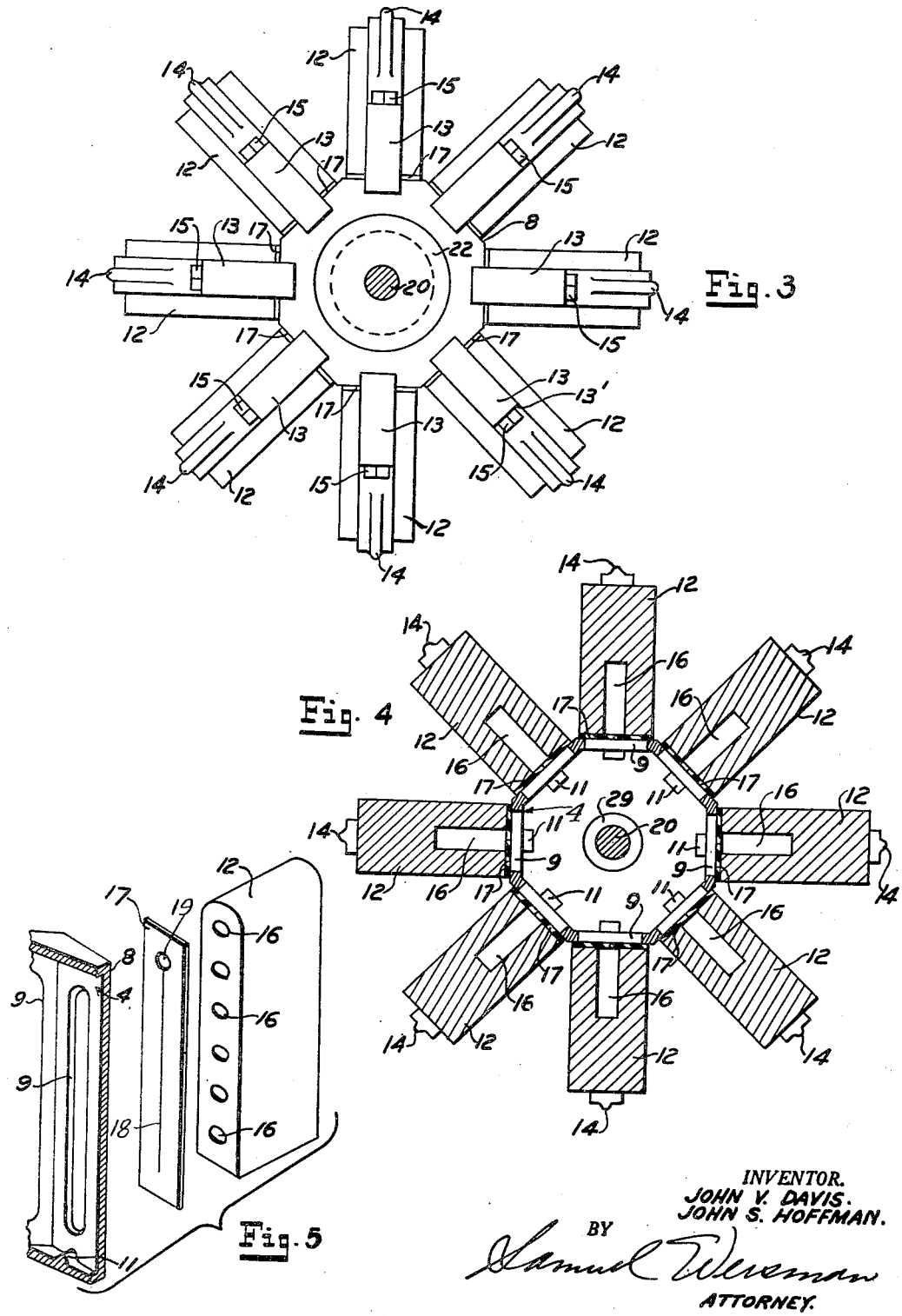

Patented Dec. 28, 1948

2,457,449

UNITED STATES PATENT OFFICE 2,457,449

FILTER

John V. Davis and John S. Hoffman, Detroit, Mich., assignors to The Udylite Corporation, Detroit, Mich., a corporation of Delaware Application May 13, 1946, Serial No. 669,310

10 Claims. (Cl. 210—120)

The present invention pertains to a novel filter, particularly of the type having an impermanent pre-coat of a replaceable material. This material is in the nature of a slurry of diatomaceous earth which requires replacement from time to time. Before replacement the used coating is preferably washed off entirely by a reverse flow of wash water. The body that carries the coating is a porous filter block, cylinder or group of blocks and the actual filtration occurs at the coating rather than in the supporting body.

The supporting body has a high porosity and, when standing in a vertical position, passes a major portion of the liquid at the lower levels and leaves the upper levels practically unused or little used. The principal object of this invention is to provide a means for inducing a more uniform distribution of the flow along the entire height of the filter in both the filtering and washing operations.

In the accomplishment of this object the supporting body consists of a porous block of series of blocks having at least one flat face on the discharge side in the filtering direction. Over this face is mounted a flexible gasket having a longitudinal slit and a permanent opening at the upper end of the slit. The gasket opens along the slit in the filtering direction and thus provides a restricted outlet for the liquid. Consequently the liquid is caused to rise along substantially the entire height of the block until reaching the level of the substantially larger opening. At this level the flow is freer and more rapid, and this is not undesirable inasmuch as substantially the entire block is at this time in service.

On the reverse or wash flow, there is normally a tendency for the wash liquid to cover and pass through only the lower portion of the block because of the high porosity of the latter. In the herein described construction, however, the reverse flow causes the gasket to close against the block along its slit and the fluid to rise to the free opening at the upper end. The wash liquid entering the opening flows downwardly and angularly through the block as well as horizontally because of the high porosity of the block. In this manner the used pre-coat is entirely washed off prior to the application of a new coating.

The blocks may be arranged in a radiating series against a hollow frame structure, although a filter may be constructed with a single block for limited capacity, in the manner outlined above.

The invention is fully disclosed by way of example in the following description and in the accompanying drawings in which:

Figure 3 is a section on the line 3—3 of Figure 2;

Figure 4 is a section on the line 4—4 of Figure 2, and

Figure 5 is an exploded detail perspective view.

References to these views will now be made by use of like characters which are employed to designate corresponding parts throughout.

Figure 1:
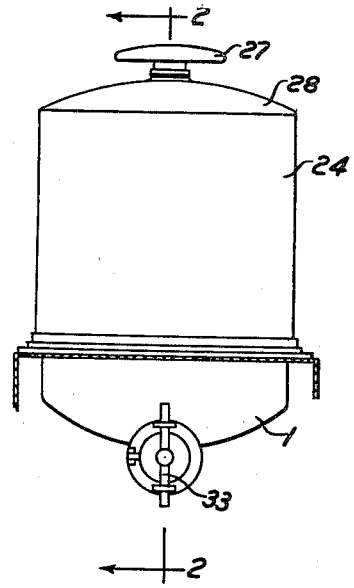
Figure 1 is an elevation of the device.
Figure 2:
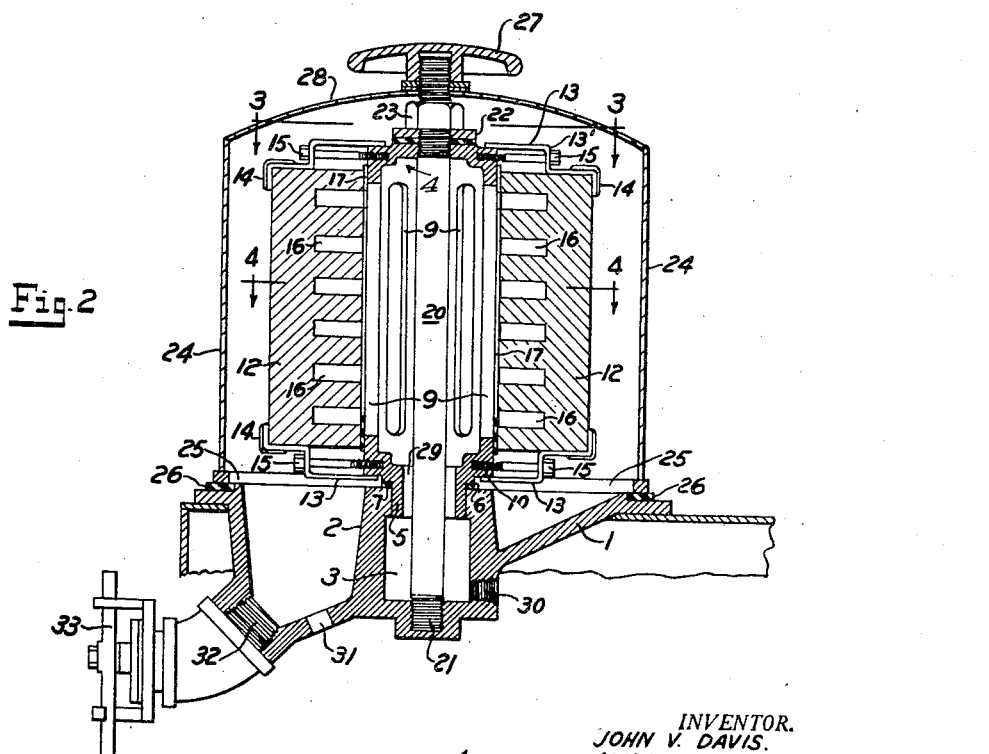
Figure 2 is a section on the line 2—2 of Figure 1.

In Figure 1 is shown a base structure 1 of any suitable shape. The base disclosed herein is designed to be mounted upon a wheeled carriage containing other mechanism as disclosed in our Design Patent No.144,482 of April 23, 1946. The base is formed with an upwardly extending boss 2 having a relatively large cavity 3.

Upon the boss 2 is mounted a central hollow frame structure 4 having a plurality of like outward faces and which is preferably octahedral as shown. One end of the frame 4 is formed with a reduced end or nipple 5 which fits into the upper end of the boss 2 and with a shoulder 6 that rests upon the boss, a gasket 7 being interposed.

Each outward side 8 of the central frame member 4 is formed with a longitudinal slot therethrough 9 over a substantial portion of its area. Below each slot is formed a tapped hole 10 extending into an internal reinforcing boss 11 for assembly purposes, as will presently be described.

Against each face 8 is secured a porous stone filter block 12 of the character shown in Figure 4. The blocks, when assembled, extend radially outward from the central frame 4. Each block is secured by a pair of angular clamps 13 at the upper and lower ends and engaging the upper and lower ends of the frame 4. Each such clamp has a jaw 14 engaging an end of the outermost face of a block 12, and is secured by a bolt 15 passed through the step 13' thereof and into the adjacent tapped hole 10.

The inward face of each block 12, or the face directly adjacent to a face 8 of the frame 4, is formed with a series of recesses 16 extending perpendicular to these faces and about halfway into the block. The recesses are spaced apart in the longitudinal direction of the frame 4 and have their open ends lying in communicating juxtaposition to the slot 9.

Such communication is, however, substantially obstructed by a flat gasket 17 inserted between each block 12 and the adjacent face 8. The gaskets are inserted before the clamps 13 are tightened and are held thereby. Each gasket 17 is formed with a longitudinal slit 18 overlying a slot 9 of the frame 4 and also with a single hole 19 registering with the upper recess 16 of the adjacent block 12.

An assembly rod 20 is passed downward through the frame 4 and is seated at 21 in the bottom of the boss 2. A suitable seal 22 on the rod 20 is laid on the upper end of the frame 4 and tightened by a nut 23.

A dome or cylinder 24 with an open bottom 25 covers the assembled blocks 12 in spaced relation thereto and rests upon a gasket 26 laid on the base 1. An assembly and packing nut 27 is fitted on the upper end of the rod 20 and bears downward on the closed top 28 of the housing 24.

The rod 20 passes freely through the nipple 5, leaving a passage 29 therein. The base 1 is formed with a port 30 communicating with the cavity 3. Externally of the nipple 2, the base is formed with a pair of ports 31 and 32, the latter having a drain or discharge valve 33.

The several ports are connected to a multiple-way valve of the character shown in my copending applications, Serial No. 599,981, filed June 18, 1945, and Serial No. 655,056, filed March 18, 1946. The operation of the filter is also described in detail in these applications.

The blocks 12 are first coated with slurry delivered from a suitable source into the base 1 and housing 24 through the port 31 by proper adjustment of the multiple-way valve, which is also connected to a pump for forcing the flow. The solid matter in the slurry, which is in the nature of diatomaceous earth, is deposited on the exposed surfaces of the blocks 12, while the liquid permeates the blocks and is forced against the gaskets 17. The gaskets open at their respective slits 18 to provide restricted passages to the slots 9 of the blocks. The restricted flow insures an adequate and uniform deposit of slurry along the length of the blocks. The deposit builds up from the lower ends to the upper ends of the blocks until the top recesses 16 are reached. At this time there is no further need of restricted flow, and the liquid passes more freely and rapidly through the holes 19 at the upper ends of the slits 18. The liquid flows downward in the frame 4 to the passage 29 and cavity 3 and is discharged at the port 30.

In the filtering operation, the same flow path is followed in the filter, although the aforementioned valve is adjusted to cut off the slurry supply and to connect both the inlet and the outlet of the base 1 to the vessel containing the solution to be filtered. As in the slurrying operation, the restriction in the gaskets is such as to preclude the entire operation from taking place at the lower portions of the filter blocks.

The slurry is washed off the blocks from time to time preparatory to the application of a new deposit. For this operation a reverse flow path is established by proper adjustment of the multiple-way valve. The gaskets are substantially closed at slits and cause the wash water to rise until the openings 19 are reached. The porosity of the filter blocks is such that, if the water entered at a lower level, it would easily flow through the blocks without reaching the upper levels. Because of the same property of the blocks, the water entering at the upper openings 19 flows freely downwardly and laterally, as well as horizontally from the openings, to clean the blocks over their entire area. In this manner the washing or de-coating operation is performed more thoroughly than has previously been possible. The wash water containing the slurry need not be reclaimed and in such case is discharged through the valve 33.

Although a specific embodiment of the invention has been illustrated and described, it will be understood that various alterations in the details of construction may be made without departing from the scope of the invention.

What we claim is:

1. In a filter, a hollow frame having a plurality of outward faces, each face having a longitudinal slot, a filter block secured to each of said faces in overlying relation to the slot thereof and having cavities opening at said slot, and a gasket inserted between each block and the adjacent face and having a slit along said slot and cavities.

2. In a filter, a hollow frame having a plurality of outward faces, each face having a longitudinal slot, a filter block secured to each of said faces in overlying relation to the slot thereof and having cavities opening at said slot, and a gasket inserted between each block and the adjacent face and having a slit along said slot and cavities, said gasket having an opening registering with one of the adjacent cavities beyond the first cavity in the flow path.

3. In a filter, a plurality of filter blocks arranged in mutually divergent relation from a common center, each block having a series of cavities formed from the face thereof nearer said center, a gasket mounted over each of said faces and having a slit along the cavities thereof, and a hollow frame structure between said center and said faces, said structure securing said gaskets to said faces and having openings communicating with said slits.

4. In a filter, a plurality of filter blocks arranged in mutually divergent relation from a common center, each block having a series of cavities formed from the face thereof nearer said center, a gasket mounted over each of said faces and having a slit along the cavities thereof, each gasket having an opening registering with the adjacent cavity that is remote in the flow path.

5. In a filter, a plurality of filter blocks arranged in mutually divergent relation from a common center, each block having a series of cavities formed from the face thereof nearer said center, a gasket mounted over each of said faces and having a slit along the cavities thereof, each gasket having an opening registering with the adjacent cavity that is remote in the flow path, a housing enclosing said blocks, a hollow frame structure between said center and said faces, said structure securing said gaskets to said faces and having openings communicating with said slits, and fluid connections to said housing and structure.

6. In a filter, a plurality of filter blocks arranged in mutually divergent relation from a common center, each block having a series of cavities formed from the face thereof nearer said center, a gasket mounted over each of said faces and having a slit along the cavities thereof, each gasket having an opening registering with the adjacent cavity that is remote in the flow path, a housing enclosing said blocks, a hollow frame structure between said center and said faces, said structure securing said gaskets to said faces and having openings communicating with said slits, and fluid connections to said housing and structure, said connections being disposed at the ends of said blocks more remote from the openings in said gaskets.

7. In a filter, a hollow frame having a plurality of outward faces, each face having a longitudinal slot, a filter block secured to each of said faces in overlying relation to the slot thereof and having cavities opening at said slot, and a gasket inserted between each block and the adjacent face and having a slit along said slot and cavities, a housing enclosing said blocks, and means for delivering fluid to said housing and for discharging fluid from said frame, said means being disposed at the end of said frame more remote from the openings in said gaskets.

8. In a filter, a hollow frame having a plurality of outward faces, each face having a longitudinal slot, a filter block secured to each of said faces in overlying relation to the slot thereof, and a gasket inserted between each block and the adjacent face of said frame, and having a longitudinal slit.

9. In a filter, a hollow frame having a plurality of outward faces, each face having a longitudinal slot, a filter block secured to each of said faces in overlying relation to the slot thereof, and a gasket inserted between each block and the adjacent face of said frame, and having a longitudinal slit, each gasket also having an opening remote from one end of the slit therein.

10. In a filter, a hollow frame having a plurality of outward faces, each face having a longitudinal slot, a filter block secured to each of said faces in overlying relation to the slot thereof, and a gasket inserted between each block and the adjacent face of said frame, and having a longitudinal slit, each gasket also having an opening remote from one end of the slit therein, a housing enclosing said blocks, and means for delivering fluid to said housing and for discharging fluid from said frame, said means being disposed at the end of said frame more remote from the openings in said gaskets.

JOHN V. DAVIS.
JOHN S. HOFFMAN.

REFERENCES CITED

The following references are of record in the file of this patent:

UNITED STATES PATENTS

| Number | Name | Date |
|---|---|---|
| 528,104 | Lindsay | Oct. 23, 1894 |

FOREIGN PATENTS

| Number | Country | Date |
|---|---|---|
| 5,372 | Great Britain | A. D. 1901 |
| 574,597 | France | Apr. 2, 1924 |